(12) United States Patent
Fukuda et al.

(10) Patent No.: US 9,201,894 B2
(45) Date of Patent: Dec. 1, 2015

(54) DATA DISTRIBUTION SYSTEM

(75) Inventors: Masaaki Fukuda, Saitama (JP);
Masaaki Isozaki, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 187 days.

(21) Appl. No.: 12/503,155

(22) Filed: Jul. 15, 2009

(65) Prior Publication Data
US 2010/0030790 A1 Feb. 4, 2010

(30) Foreign Application Priority Data

Jul. 30, 2008 (JP) .................................. 2008-197070

(51) Int. Cl.
G06F 17/30 (2006.01)

(52) U.S. Cl.
CPC ................................ G06F 17/30194 (2013.01)

(58) Field of Classification Search
CPC ..... G06F 21/41; G06F 21/10; G06F 21/6227; G06F 3/0652; G06F 12/1416; G06F 17/30265; H04N 21/4627; H04N 5/913; H04N 7/1675; H04N 2201/3205; G06Q 20/1235
USPC ............ 707/999.201, 999.202, 999.204, 706, 707/749, 999.001, 999.009, 999.101; 709/203, 217, 219; 705/14.69, 14.73, 705/21, 30
See application file for complete search history.

(56) References Cited

U.S. PATENT DOCUMENTS

| 7,324,555 | B1 | 1/2008 | Chen |
| 7,809,793 | B2 | 10/2010 | Kimura |
| 8,219,635 | B2 | 7/2012 | Ganesan |
| 8,266,716 | B2 * | 9/2012 | Bellwood et al. ............... 726/30 |
| 8,352,535 | B2 * | 1/2013 | Peled et al. ................... 709/200 |
| 2002/0078461 | A1 | 6/2002 | Boykin |
| 2002/0194356 | A1 * | 12/2002 | Chan et al. .................... 709/231 |
| 2003/0191753 | A1 | 10/2003 | Hoch |
| 2003/0204605 | A1 * | 10/2003 | Hudson et al. ................ 709/228 |

(Continued)

FOREIGN PATENT DOCUMENTS

| JP | 2002298007 | 10/2002 |
| JP | 2003223385 A | 8/2003 |

(Continued)

OTHER PUBLICATIONS

OA for corresponding JP application JP-2008-197070, dated Jun. 1, 2010.

(Continued)

*Primary Examiner* — Boris Gorney
*Assistant Examiner* — Bao Tran
(74) *Attorney, Agent, or Firm* — Matthew E. Dernier, Esq.

(57) ABSTRACT

There is provided a data distribution system having a distribution device for holding a data file which is a distribution object and a plurality of user terminals, wherein each of the user terminals obtains each of a plurality of file pieces from any of the other user terminals or the distribution device, the plurality of file pieces being obtained by dividing the data file, and the plurality of file pieces obtained are assembled to thereby obtain the data file, at least one predetermined file piece among the plurality of file pieces is a restricted piece for which obtaining from the other user terminals is restricted, and the distribution device restricts distribution of the restricted piece to each of the user terminals, based on a predetermined condition.

7 Claims, 7 Drawing Sheets

(56) References Cited

U.S. PATENT DOCUMENTS

| | | | |
|---|---|---|---|
| 2003/0204613 | A1 | 10/2003 | Hudson |
| 2005/0192963 | A1* | 9/2005 | Tschiegg et al. .................. 707/9 |
| 2005/0216473 | A1* | 9/2005 | Aoyagi et al. .................. 707/10 |
| 2005/0273399 | A1* | 12/2005 | Soma et al. ..................... 705/26 |
| 2006/0047623 | A1 | 3/2006 | Kimura |
| 2006/0080454 | A1 | 4/2006 | Li |
| 2006/0167881 | A1* | 7/2006 | Aydar et al. ....................... 707/9 |
| 2007/0263632 | A1* | 11/2007 | Sobue et al. ............... 370/395.2 |
| 2008/0055422 | A1* | 3/2008 | Takayama ................ 348/211.8 |
| 2008/0133666 | A1 | 6/2008 | Chavez |
| 2008/0172718 | A1* | 7/2008 | Bradley ............................ 726/1 |
| 2010/0138382 | A1* | 6/2010 | Nagoya et al. ................ 707/609 |

FOREIGN PATENT DOCUMENTS

| | | |
|---|---|---|
| JP | 2003345761 | 12/2003 |
| JP | 2004295439 A | 10/2004 |
| JP | 2005524132 A | 8/2005 |
| JP | 2006-11550 A | 1/2006 |
| JP | 2006-24001 A | 1/2006 |
| JP | 2006178782 A | 7/2006 |
| JP | 2006202186 A | 8/2006 |
| JP | 2007264730 A | 10/2007 |
| WO | 2007024970 A | 3/2007 |

OTHER PUBLICATIONS

EP Office Action for corresponding European Patent Application No. 09251828.1, dated Feb. 16, 2011.

JP Office Action for corresponding Japanese Patent Application No. 2008-197070, Jan. 18, 2011.

Extended European Search Report for corresponding application 09251828.1-1527, dated Dec. 7, 2009.

European Search Report for a related EP Application No. 09802847.5, dated Mar. 21, 2013.

J. A. Pouwelse et al: "TRIBLER: a social-based peer-to-peer system", Concurrency and Computation: Practice and Experience, vol. 20, No. 2, pp. 127-138, XP055056297, ISSN: 1532-0626, Jan. 1, 2007.

Jun Wang et al: "Distributed collaborative filtering for peer-to-peer file sharing systems", Proceedings of the 2006 ACM Symposium on Applied Computing, pp. 1026-1030, XP055056322, Jan. 1, 2006.

International Search Report for application PCT/JP2009/062921, dated Aug. 25, 2009.

Search Report for European Application EP 09251828, dated Nov. 30, 2009.

Office Action for Japanese Application 2008-197070, dated Jun. 1, 2010, and partial translation.

International Preliminary Report on Patentability and Written Opinion for application PCT/JP2009/062921, dated Mar. 8, 2011.

Office Action for related U.S. Appl. No. 13/000,506, dated Sep. 26, 2012.

Office Action for related U.S. Appl. No. 13/000,506, dated Jan. 11, 2013.

Office Action for Japanese Patent Application No. 2008-197069, dated on Feb. 5, 2013.

Office Action for related U.S. Appl. No. 13/000,506, dated Jul. 18, 2013.

Office Action for related U.S. Appl. No. 13/000,506, dated Jun. 11, 2014.

* cited by examiner

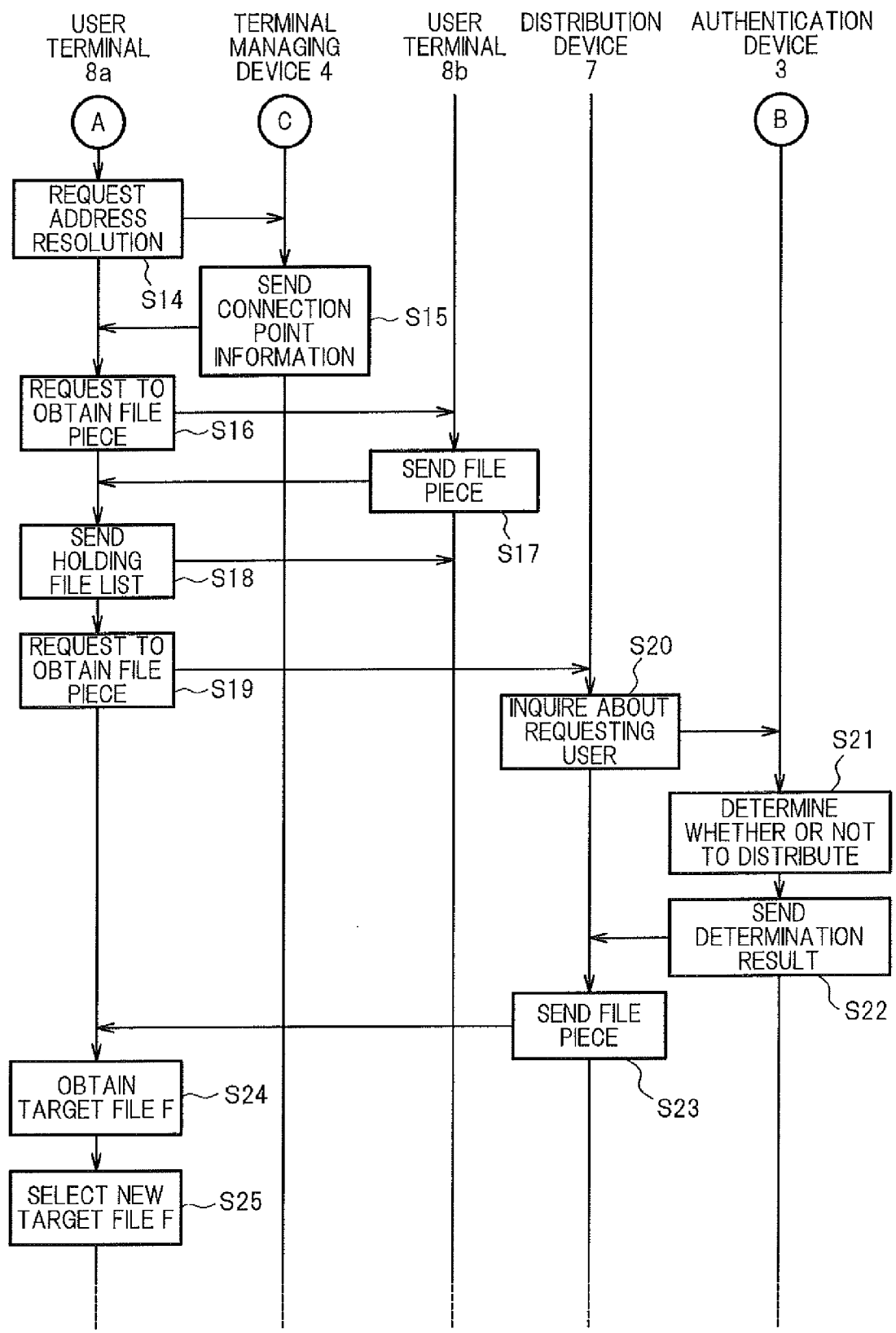

DATA DISTRIBUTION SYSTEM

BACKGROUND OF THE INVENTION

1. Field of the Invention

The present invention relates to a data distribution system, a user terminal, an information processing method, and an information storage medium, in which each user terminal obtains each of a plurality of file pieces from a distribution device or another user terminal to thereby obtain a distribution object data file, the file pieces being obtained by dividing the distribution object data file.

2. Description of the Related Art

Conventionally, there is known a data distribution system in which a distribution device holds a data file of various contents, such as sound, motion picture, and so forth, as a distribution object, and each data file is distributed to a client user terminal in response to a request therefrom. In recent years, peer-to-peer type data exchange systems for exchanging a data file directly between user terminals (peers) have become available. In some of such data exchange systems, a data file is divided into a plurality of file pieces and each file piece is exchanged. According to such a technique, each user terminal can obtain from different devices a plurality of file pieces constituting a data file which the user wishes to obtain. This makes it possible to exchange large volume data among user terminals, while avoiding concentration of network traffic to a specific distribution device or a specific user terminal.

SUMMARY OF THE INVENTION

In the above described system, there may be a case in which distribution of a distribution object data file is desired to be restricted so that a user terminal can obtain such a data file only when a certain condition is satisfied.

The present invention has been conceived in view of the above, and one of the objects of the present invention is to provide a data distribution system, a user terminal, an information processing method, and an information storage medium capable of imposing distribution restriction on a data file when exchanging data in units of file piece among user terminals.

In order to attain the above described object, according to one aspect of the present invention, there is provided a data distribution system comprising a distribution device for holding a data file which is a distribution object and a plurality of user terminals, wherein each of the user terminals comprises a file piece obtaining unit for obtaining each of a plurality of file pieces from any of the other user terminals or the distribution device, the plurality of file pieces being obtained by dividing the data file; and a file obtaining unit for assembling the plurality of file pieces obtained to thereby obtain the data file, at least one predetermined file piece among the plurality of file pieces is a restricted piece for which obtaining from the other user terminals is restricted, and the distribution device restricts distribution of the restricted piece to each of the user terminals, based on a predetermined condition.

In the above described data distribution system, the distribution device may restrict, as the predetermined condition, distribution of the restricted piece before arrival of a predetermined disclosure date and time.

The above described data distribution system may further comprise a file information managing device for sending file information about the data file in response to a request from each of the user terminals, wherein the file information includes information specifying the restricted piece.

In the above described data distribution system, the file information may further include information about the predetermined condition, and the file piece obtaining unit may determine whether or not the predetermined condition indicated by the file information is satisfied, and upon determination that the condition is satisfied, send a request for obtaining the restricted piece to the distribution device.

According to another aspect of the present invention, there is provided a user terminal connected to a distribution device for holding a data file which is a distribution object and to one or more other user terminals, comprising a file piece obtaining unit for obtaining each of a plurality of file pieces from any of the other user terminals or the distribution device, the plurality of file pieces being obtained by dividing the data file; and a file obtaining unit for assembling the plurality of file pieces obtained to thereby obtain the data file, wherein at least one predetermined file piece among the plurality of file pieces is a restricted piece for which obtaining from the other user terminals is restricted, and for which obtaining from the distribution device is restricted based on a predetermined condition.

According to still another aspect of the present invention, there is provided an information processing method to be carried out using a user terminal connected to a distribution device for holding a data file which is a distribution object and to one or more other user terminals, the method comprising a file piece obtaining step of obtaining each of a plurality of file pieces from any of the other user terminals or the distribution device, the plurality of file pieces being obtained by dividing the data file; and a file obtaining step of assembling the plurality of file pieces obtained to thereby obtain the data file, wherein at least one predetermined file piece among the plurality of file pieces is a restricted piece for which obtaining from the other user terminals is restricted, and for which obtaining from the distribution device is restricted based on a predetermined condition.

According to yet another aspect of the present invention, there is provided a computer readable information storage medium storing a program for causing a user terminal connected to a distribution device for holding a data file which is a distribution object and to one or more other user terminals, to function as a file piece obtaining unit for obtaining each of a plurality of file pieces from any of the other user terminals or the distribution device, the plurality of file pieces being obtained by dividing the data file; and a file obtaining unit for assembling the plurality of file pieces obtained to thereby obtain the data file, wherein at least one predetermined file piece among the plurality of file pieces is a restricted piece for which obtaining from the other user terminals is restricted, and for which obtaining from the distribution device is restricted based on a predetermined condition.

BRIEF DESCRIPTION OF THE DRAWINGS

FIG. 8 is a flowchart of the example of the process to be carried out by the data distribution system according to this embodiment.

DESCRIPTION OF THE PREFERRED EMBODIMENTS

In the following, an embodiment of the present invention will be described in detail with reference to the accompanying drawings.

Figure 1:
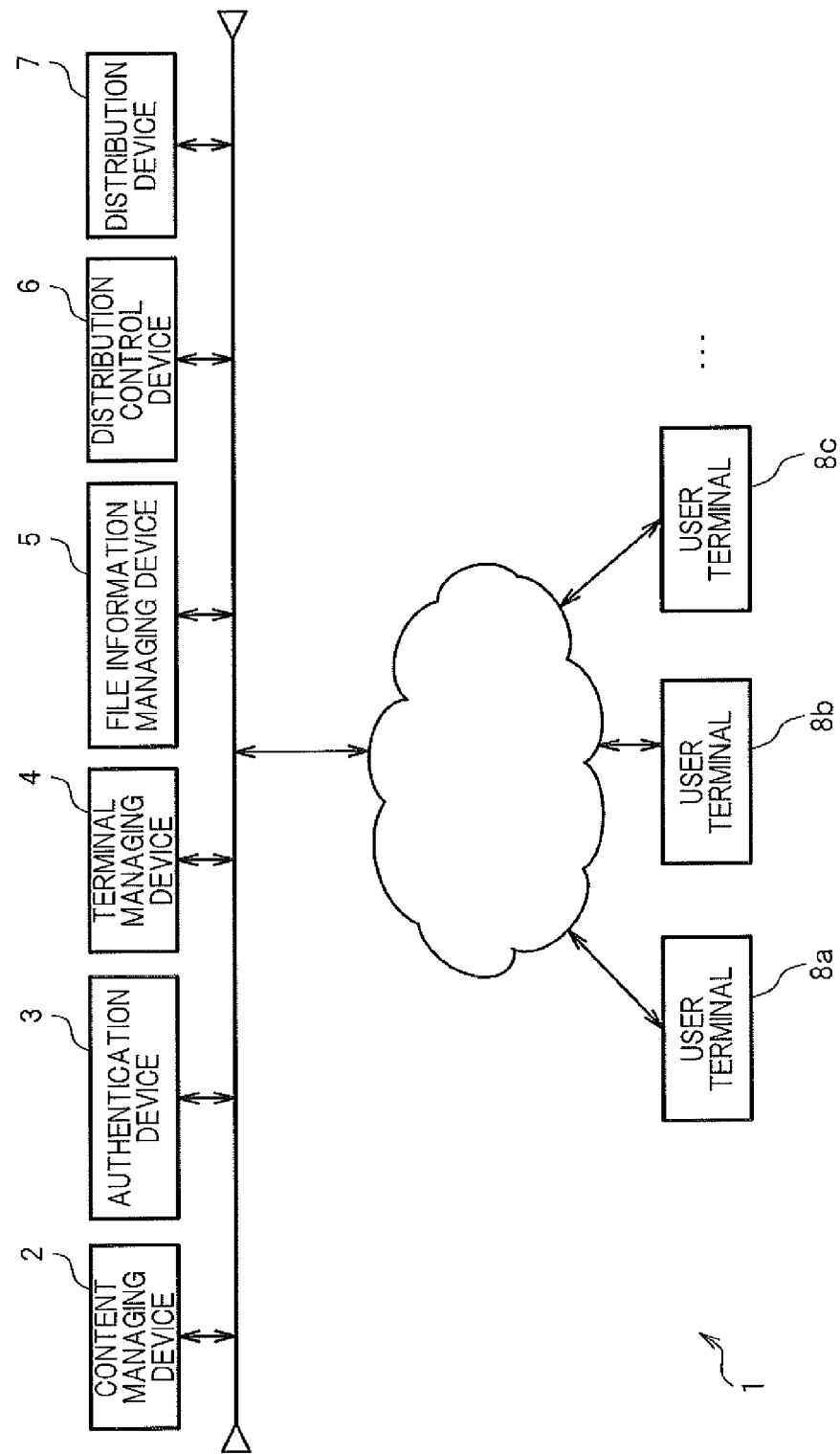
FIG. 1 is a block diagram showing an example of a system structure of a data distribution system according to an embodiment of the present invention system.

As shown in FIG. 1, a data distribution system 1 according to one embodiment of the present invention comprises a content managing device 2, an authentication device 3, a terminal managing device 4, a file information managing device 5, a distribution control device 6, a distribution device 7, and a user terminal 8, all of the respective devices being mutually connected via a communication network, such as a LAN, the Internet, and the like. The data distribution system 1 includes a plurality of user terminals 8, which are hereinafter referred to as user terminals 8a, 8b, 8c, and so forth. Also, the data distribution system 1 may include a plurality of file information managing devices 5, a plurality of distribution control devices 6, and a plurality of distribution devices 7.

In the data distribution system 1 according to this embodiment, one or more distribution devices 7 each hold a plurality of data files which are distribution objects, and serve as a primary distributor of the data files. In order to obtain a desired data file, each user terminal 8 obtains each of a plurality of file pieces obtained by dividing the data file from the distribution device 7 or another user terminal 8, and assembles the plurality of obtained file pieces to thereby obtain the data file.

The content managing device 2, authentication device 3, terminal managing device 4, file information managing device 5, distribution control device 6, and distribution device 7 are each, e.g., an information processing device such as a server computer or the like. The content managing device 2 manages information concerning a plurality of contents which are distribution objects in the data distribution system 1, and in response to a request from a user terminal 8, provides the user terminal 8 with information concerning the requested content. Note that each of the plurality of contents managed by the content managing device 2 corresponds to one or more data files to be distributed by the distribution device 7, and the content information provided by the content managing device 2 is used in selection by the user terminal 8 of a data file to be obtained.

The authentication device 3 authenticates a user attempting to obtain a data file, using the user terminal 8. Then, the terminal managing device 4 receives a log-in request from the user terminal 8 authenticated by the authentication device 3. Where each user terminal 8 holds unique terminal identification information (a signal ID), the terminal managing device 4 stores the signal ID of the user terminal 8 having made a log-in request and information (an IP address, a port number, and so forth) specifying a point on a network to which the user terminal 8 is connected so as to be correlated to each other. Upon receipt from each user terminal 8 of an address resolution request designating the signal ID of another user terminal 8 to which the user terminal 8 is going to connect, the terminal managing device 4 sends information specifying a point to which the user terminal 8 identified by the designated signal ID is connected to the user terminal 8 having sent the address resolution request.

Note that the terminal managing device 4 may have a function as a STUN (Simple Traversal of User Datagram Protocol through Network Address Translators) server in addition to the above described address resolution function. Use of the STUN server function of the terminal managing device 4 makes it possible for a user terminal 8 which communicates with an external network via a NAT (Network Address Translator) to exchange data in a peer-to-peer manner with another user terminal 8.

The file information managing device 5 stores file information (metadata) for a data file held as a distribution object by the distribution device 7, the file information being necessary for a user terminal 8 to obtain the concerned data file. The file information includes information (URL or the like) specifying a point to which the distribution control device 6 for controlling data file distribution is connected, the number of file pieces constituting the data file, and a hash value of each file piece, and so forth. In response to a file information obtaining request from a user terminal 8, the file information managing device 5 sends file information of the requested data file.

For each data file subjected to distribution control, the distribution control device 6 records provider information designating a device from which the concerned data file can be obtained. Specifically, provider information of each data file includes, e.g., information (URL or the like) specifying a point to which the distribution device 7 holding the data file is connected and the signal IDs of user terminals 8 which have obtained, or have started a process to obtain, the data file. In response to a provider information obtaining request from a user terminal 8, the distribution control device 6 sends provider information of the requested data file. In the above, the user terminal 8 sends a list showing data files which the user terminal 8 has already obtained, and has started a process to obtain, together with the provider information obtaining request, to the distribution control device 6, which in turn adds the signal ID of the user terminal 8 to the provider information of each data file shown in the list.

The distribution device 7 holds one or more distribution object data files, and distributes the data file in units of a file piece to each user terminal 8. Note that a file piece is data obtained by dividing one data file into a predetermined size or number. Specifically, in response to a file piece obtaining request from a user terminal 8, the distribution device 7 distributes the requested file piece.

Figure 2:
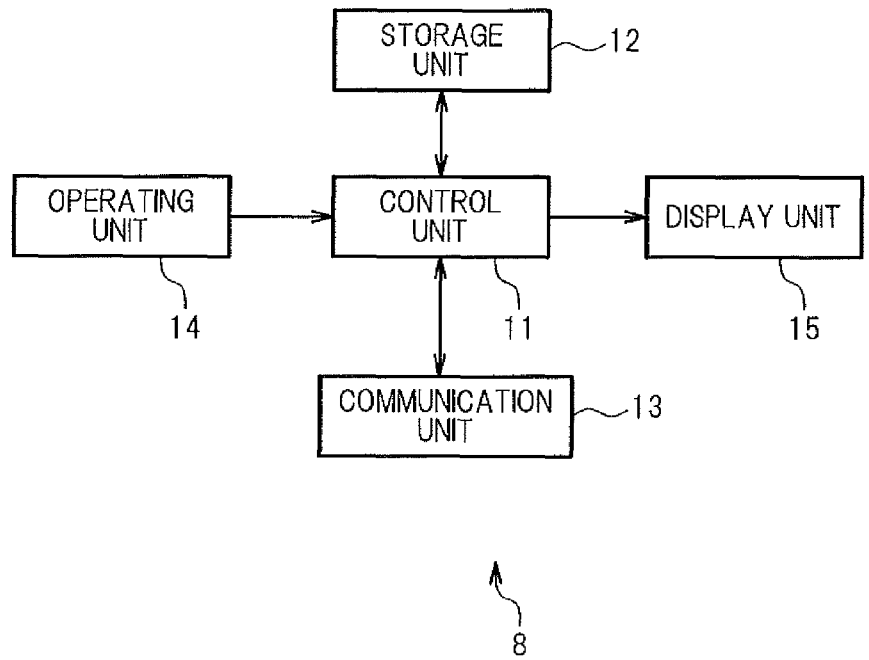
FIG. 2 is block diagram showing an example of a structure of a user terminal according to this embodiment.

The user terminal 8 may be any of a variety of information processing devices, such as, e.g., a personal computer, a consumer game device, a portable game device, a content player, and so forth. The user terminal 8 is used by a user utilizing the data distribution system 1 according to this embodiment. In this embodiment, as shown in FIG. 2, the user terminal 8 comprises a control unit 11, a storage unit 12, a communication unit 13, an operating unit 14, and a display unit 15.

The control unit 11 is a CPU or the like, and carries out a variety of information processes according to a program stored in the storage unit 12. The storage unit 12 is e.g., a memory element, such as a RAM, a ROM, and so forth, and a hard disk or the like, and stores a program to be carried out by the control unit 11 and/or a data file which the user terminal 8 in question has already obtained. The storage unit 12 also functions as a working memory of the control unit 11. The communication unit 13 is a network interface, such as a LAN card or the like, and sends information output from the control unit 11 to another device via a communication network. Also, the communication unit 13 receives information arrived via a network, and outputs to the control unit 11.

The operating unit 14 may be, e.g., a keyboard, a mouse, a touch panel, or the like, and upon receipt of an instruction operation carried out by a user, outputs the content of the instruction operation to the control unit 11. The display unit 15 may be a liquid crystal display panel, a home-use television set receiver, and so forth, and displays various information items on a screen according to an instruction from the control unit 11 to thereby present the information to a user.

Figure 3:
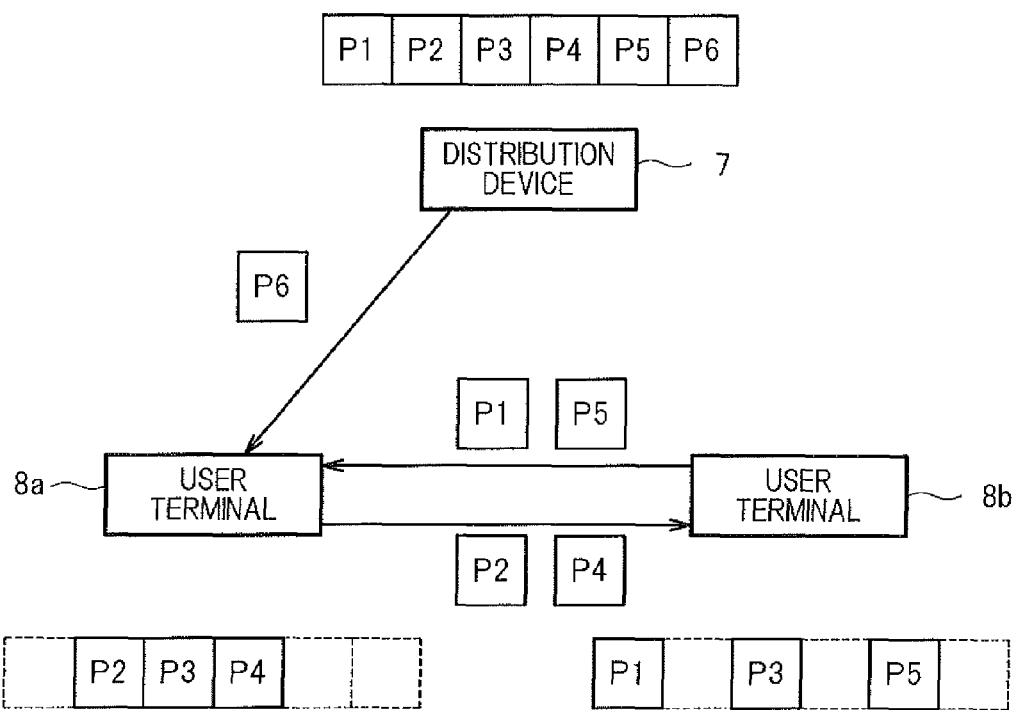
FIG. 3 is a diagram explaining one example of file piece exchanging among devices in this embodiment.

Here, an example of file piece exchanging to be carried out when each user terminal 8 attempts to obtain one distribution object data file will be outlined, referring to FIG. 3. Note that a data file to be obtained by a user terminal 8 is hereinafter referred to as a target file F, and file pieces obtained by diving the target file F into n number of pieces are respectively denoted as file pieces P1, P2, ... Pn. In the following, assume as a specific example a case in which the user terminals 8a and 8b attempt to obtain the same target file F comprising six file pieces, namely, file pieces P1 to P6.

In the example shown in FIG. 3, the user terminal 8a has already obtained the file pieces P2, P3, and P4 from another user terminal 8, and the user terminal 8b has already obtained file pieces P1, P3, and P5 from still another user terminal 8. Suppose here that the user terminal 8a connects to the user terminal 8b in order to obtain a file piece yet to be obtained. Thereupon, in response to a request from the user terminal 8a, the user terminal 8b sends the file pieces P1 and P5, which the user terminal 8b holds but the user terminal 8a does not, to the user terminal 8a, so that the user terminal 8a can obtain the two file pieces from the user terminal 8b. In the above, moreover, the user terminal 8a sends the file pieces P2 and P4, which the user terminal 8a holds but the user terminal 8b does not, to the user terminal 8b.

Even with the file pieces P1 and P5 obtained from the user terminal 8b, the user terminal 8a still does not have the file piece P6. Therefore, the user terminal 8a sends a request for obtaining the file piece P6 to the distribution device 7, and in response to the request, the distribution device 7 distributes the file piece P6 to the user terminal 8a. Through this distribution, the user terminal 8a can finally obtain all file pieces constituting the target file F from another user terminals 8 or the distribution device 7.

Note that each user terminal 8 can eventually obtain all file pieces from the distribution device 7 by sending a file piece obtaining request thereto as the distribution device 7 holds all file pieces. However, each user terminal 8 first attempts to obtain a file piece from another user terminal 8 which has already obtained, or has started a process to obtain, the target file F in question, and moreover, provides a file piece which the user terminal 8 has already obtained to the other user terminal 8. With the above, in the data distribution system 1 according to this embodiment, increase of network load as a result of concentration of access to the distribution device 7 can be avoided.

Figure 4:
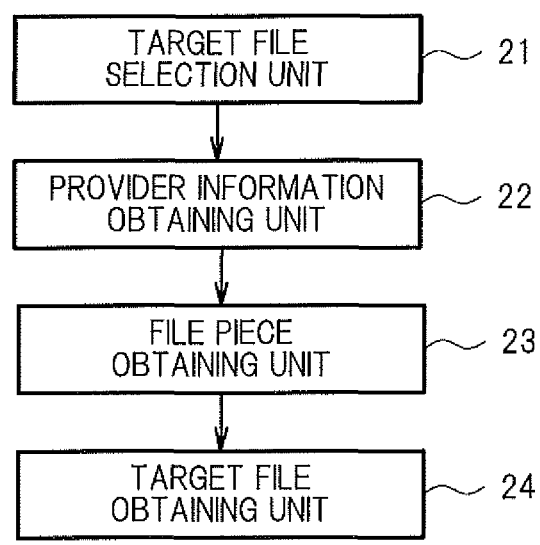
FIG. 4 is a functional block diagram showing an example of a function of the user terminal according to this embodiment.

In the following, a specific example of a function to be realized by the user terminal 8 in this embodiment will be described. As shown in FIG. 4, the user terminal 8 functionally comprises a target file selection unit 21, a provider information obtaining unit 22, a file piece obtaining unit 23, and a target file obtaining unit 24. These functions can be realized by the control unit 11 by carrying out a program stored in the storage unit 12. This program may be provided stored in a variety of computer readable information storage media, such as, e.g., a CD-ROM, a DVD-ROM, and so forth, or provided via a communication network, such as the Internet.

Initially, the target file selection unit 21 selects a target file F to obtain from among the plurality of data files held in the distribution device 7. For example, the target file selection unit 21 obtains from the content managing device 2 a list of contents to be distributed by the data distribution system 1, and displays the respective contents included in the list on the display unit 15 to thereby present the contents to a user. Then, a data file corresponding to the content selected by a user by operating the operating unit 14 from among the presented contents is selected as a target file F.

Also, in order to select a target file F, the target file selection unit 21 may send list information (hereinafter referred to as a holding file list L) showing data files which the user terminal 8 in question has already obtained among those to be distributed by one or more distribution devices 7 and user attribute information such as about the taste of a user, which is input beforehand by the user, to the content managing device 2. The holding file list L may be stored in the user terminal 8 as, e.g., a part of download history information. Then, the content managing device 2 produces a list (a recommended content list) of content highly related to a data file included in the received holding file list L and content reflecting the taste of a user, based on the received information, and sends the recommended content list to the user terminal 8. Thereafter, the target file selection unit 21 presents the content included in the recommended content list to a user, and then selects as a target file F a data file corresponding to the content selected by the user among the contents presented.

Alternatively, the target file selection unit 21 may automatically select a target file F. As a specific example, in the case where the content managing device 2 produces a recommended content list, based on the information sent from the user terminal 8, as described above, the target file selection unit 21 may obtain the recommended content list and select a data file corresponding to each of the contents included in the recommended content list as a target file F without receiving a selection instruction operation by a user.

Note that the above described recommended content list may be produced not by the content managing device 2 but on the user terminal 8 side. That is, the target file selection unit 21 obtains a content list from the content managing device 2, then extracts recommended content from the contents included in the content list, based on the user attribute information, the holding file list L, and the like, held by the user terminal 8 in question, to thereby produce a recommended content list. Then, the target file selection unit 21 may encourage a user to select content to obtain from among those included in the produced recommended content list or select as a target file F a data file corresponding to each content included in the recommended content list.

The provider information obtaining unit 22 obtains from the distribution control device 6 provider information indicating a device which may possibly hold a file piece constituting the target file F selected by the target file selection unit 21. Specifically, after a user terminal 8 logs in the terminal managing device 4 so that the signal ID thereof remains registered, the provider information obtaining unit 22 obtains file information of a target file F from the file information managing device 5, then connects to the distribution control device 6, based on the information included in the obtained file information and specifying a point to which the distribution control device 6 is connected, and obtains provider information of the target file F from the distribution control device 6.

The file piece obtaining unit 23 sequentially connects to a plurality of provider devices indicated by the provider information obtained by the provider information obtaining unit 22 to obtain the respective file pieces constituting the target file F. Here, each of the plurality of provider devices is either a user terminal 8, among those other than that user terminal 8, which has already obtained, or started a process to obtain, the same target file F or the distribution device 7 that is the primary distributor of the target file F.

Note that as described above, the file piece obtaining unit 23 attempts to obtain a file piece from another user terminal 8 prior to the distribution device 7, and sends to the distribution device 7 a request for obtaining a file piece which cannot be obtained from any user terminal 8 only when all file pieces cannot be obtained from a predetermined number of user terminals 8 indicated by the provider information. Note that, as will be described later, an obtaining request for a predetermined file piece designated by the file information obtained by the provider information obtaining unit 22 may always be sent to the distribution device 7.

Every time when a file piece is obtained, the file piece obtaining unit 23 may calculate a hash value of the file piece, and compare for verification with the hash value of the file piece included in the file information obtained from the file information managing device 5. This makes it possible to verify the legitimacy of the content of a file piece obtained from another user terminal 8.

As shown in the example shown in FIG. 3, the file piece obtaining unit 23 distributes a file piece which the user terminal 8 has already obtained from another user terminal 8 or the distribution device 7 to a still another user terminal 8 in response to a request therefrom. With the above, file piece exchanging among a plurality of user terminals 8 can be realized.

The target file obtaining unit 24 assembles the plurality of file pieces obtained by the file piece obtaining unit 23, whereby the user terminal 8 can obtain the target file F selected by the target file selection unit 21.

One of the characteristics of this embodiment is that, when the file piece obtaining unit 23 attempts to obtain a file piece from, or distributes a file piece to, another user terminal 8, a list (that is, a holding file list L) of data files which the other user terminal 8 has already obtained is obtained from the other user terminal 8, in addition to the file piece being exchanged. For example, every time of obtaining a new target file F, each user terminal 8 adds information specifying the obtained target file F to a holding file list L, and when exchanging a file piece (that is, obtaining and/or distributing a file piece) sends the holding file list L to another user terminal 8 with which the file piece is exchanged.

Information about a data file included in the holding file list L obtained from another user terminal 8 is used when the user terminal 8 having obtained the holding file list L selects a data file to be newly obtained. As described above, as a file piece is exchanged among user terminals 8 which attempt to obtain the same target file F, a data file included in the holding file list L is considered as corresponding to content in which a user wishing to obtain the same target file F is interested. Therefore, using such information in selection of a data file to be newly obtained, the user terminal 8 can determine as a file to be newly obtained a data file which is highly related to the target file F already obtained.

As a specific example, the target file selection unit 21 produces a recommended file list, based on a plurality of holding file lists L obtained from a plurality of other user terminals 8 when the file piece obtaining unit 23 obtains a file piece. Then, information about content corresponding to a data file included in the recommended file list is obtained from the content managing device 2 and presented to a user as a recommended content list. Then, a data file corresponding to the content selected by the user among those shown in the list is selected as a target file F to be newly obtained. Alternatively, the target file selection unit 21 may automatically select a target file F to be newly obtained from among the data files included in the produced recommended file list. That is, e.g., after production of a recommended file list, the target file selection unit 21 may select a target file F to be newly obtained according to a condition to be described later without receiving an instruction operation by a user via the operating unit 14.

In the above, as a method for producing a recommended file list, there is available a method for simply listing the data file included in the obtained holding file list L. However, the method is not limited to the one described above. Instead, the target file selection unit 21 may narrow down the data files to be included in the recommended file list, based on various criteria. Specifically, e.g., the target file selection unit 21 may include in a recommended file list a data file which is commonly included in more than a predetermined number of file lists L or in file lists L corresponding to more than a predetermined percentage of the plurality of holding file lists L obtained from different user terminals 8.

Here, assume that a holding file list L to be exchanged with another user terminal 8 may include relevant information describing how a user terminal 8 holding a data file included in the holding file list L has obtained or utilizes the data file. The target file selection unit 21 may select a data file to be included in the recommended file list, based on the relevant information. Information, among such relevant information, which describes how the user terminal 8 has obtained a data file may include information describing, e.g., whether the user terminal 8 has selected the data file as a data file to be obtained, based on selection by a user or irrespective of an instruction by a user (that is, selected based solely on a recommended content list produced by the content managing device 2 or the like). Also, information describing how a user terminal 8 utilizes a data file may include the number of times the data file has been executed or reproduced. Parameter information indicating data file evaluation by a user, such as whether or not the data file is included in favorites of a user, may be included. For example, the target file selection unit 21 carries out weighting process on each data file included in the obtained holding file lists L, depending on the above described relevant information, to calculate a weighting addition for each data file to thereby obtain a rating value of each data file, and selects as a data file to be included in the recommended file list a data file with the calculated rating value equal to or larger than a predetermined value. With the above, it is possible to include in a recommended file list with priority e.g., a data file corresponding to content explicitly selected to be obtained by users or repetitively reproduced by users.

In addition, the target file selection unit 21 may carry out filtering on a data file included in the obtained holding file list L, based on a predetermined condition, to produce a recommended file list. For example, the target file selection unit 21 excludes a data file already obtained by the user terminal 8 from data files to be included in the recommended file list, based on its own holding file list L. In addition, a data file which is assumed, based on the user attribute information registered beforehand by a user, to not be of interest to the user may be excluded from data files to be included in the recommended file list.

Further, each user terminal 8 may transfer not only a holding file list L indicating a data file which the user terminal 8 has obtained but also a holding file list L obtained from another user terminal 8 to a still another user terminal 8. That is, each user terminal 8 may obtain from another user terminal 8 to which the user terminal 8 connects to obtain or distribute a file piece not only a holding file list L indicating a data file which the other user terminal 8 has obtained but also a holding file list L which the other user terminal 8 has obtained from still another user terminal 8. In this case, similarly to the above describe example, each user terminal 8 can select a data file to be newly obtained, referring to a plurality of holding file lists L obtained from the other user terminals 8.

Note that in this case unlimited transferring of a holding file list L to another user terminal 8 would result in not only increase of network traffic but also inclusion of a data file with low relevance in a recommended file list. In view of the above, each user terminal 8 may send a holding file list L obtained from another user terminal 8 and held by itself to still another user terminal 8 only when a predetermined condition is satisfied. A predetermined condition in this case may include, e.g., a condition that the holding file list L has been transferred at only fewer than a predetermined maximum transfer number of times. In this example, each user terminal 8 having obtained a holding file list L from another user terminal 8 adds one to the transfer number of times recorded and correlated to the obtained holding file list L before transferring the obtained holding file list L to still another user terminal 8, and does not transfer a holding file list L with the transfer number of times thereof equal to the predetermined maximum transfer number of times to still another user terminal 8. With the above, unlimited transferring of a holding file list L can be prevented.

Further, the user terminal 8 may hold history information about other user terminals 8 to which the user terminal 8 has ever connected to exchange a file piece, and may restrict exchange of a holding file list L with the other user terminals 8, based on the history information. For example, the user terminal 8 may not send a holding file list L to a user terminal 8 with which the user terminal 8 has ever exchanged a file piece within a predetermined past period of time. Also, the user terminal 8 may not obtain a holding file list L which the user terminal 8 already holds among the holding file lists L held by another user terminal 8 to which the user terminal 8 has connected to exchange a file piece, from the other user terminal 8. Note that in this case the holding file list L includes information (e.g., a signal ID) which identifies a user terminal 8 (that is, a user terminal 8 which produces and initially distributes the holding file list L) having obtained a data file included in the holding file list L. Referring to the information, each user terminal 8 can exclude a holding file list L which the user terminal 8 has already obtained from file lists to be obtained from another user terminal 8.

Further, in order to prevent unlimited increase of holding file lists L held, each user terminal 8 may delete a holding file list L which satisfies a predetermined condition. The predetermined condition may include, e.g., a condition that a predetermined period of time has passed after obtaining the holding file list L. Furthermore, with more than a predetermined number of holding file lists L having been obtained, the user terminal 8 may delete the holding file list L held, beginning with one having the oldest obtaining date and time.

Figure 5:
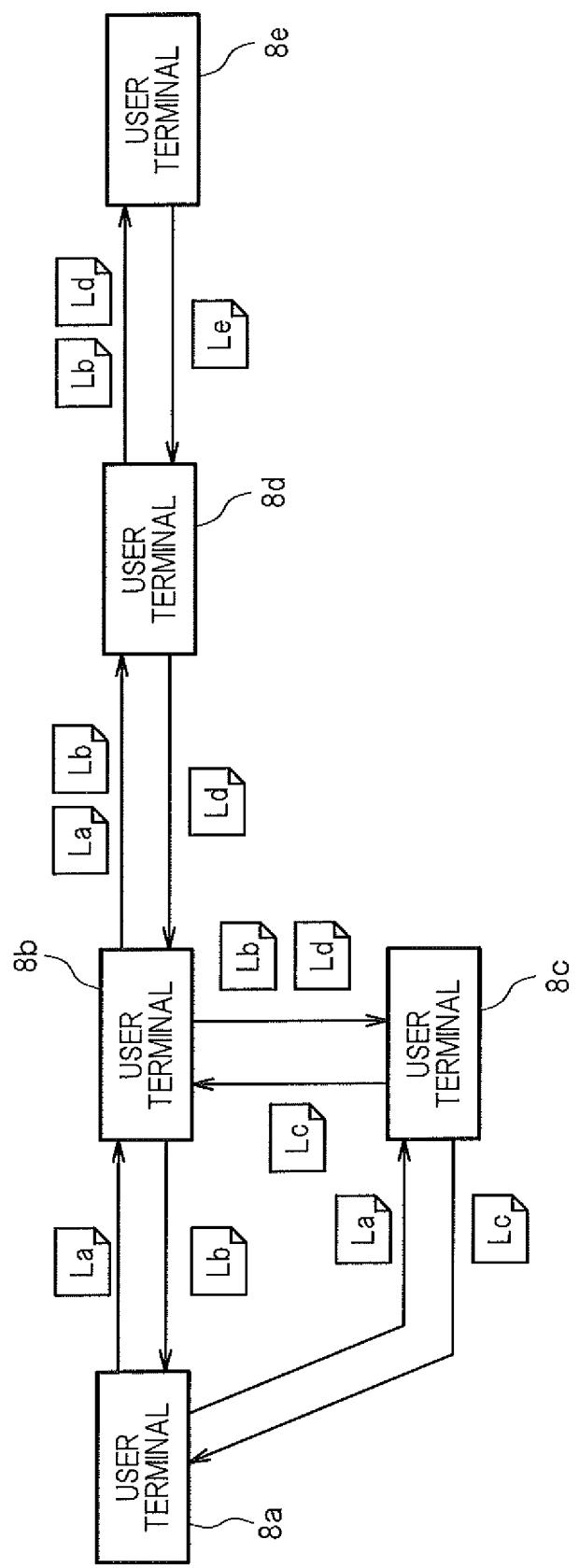
FIG. 5 is a diagram explaining an example of transferring of a holding file list in this embodiment.

FIG. 5 is a diagram explaining one example of such transferring of a holding file list L. Note that holding file lists L showing data files obtained by the respective user terminals 8a to 8e and originally held by the user terminals 8a to 8e are denoted as holding file lists La to Le, respectively. In the example shown in FIG. 5, the user terminal 8a connects to the user terminals 8b and 8c to exchange a file piece, then sends the holding file list La held by itself to the user terminals 8b and 8c, and in turn obtains the holding file lists Lb and Lc from the user terminals 8b and 8c. Thereafter, the user terminal 8b sequentially connects to the user terminals 8d and 8c to exchange a file piece. In this case, the user terminal 8b sends the holding file lists La and Lb held by itself to the user terminal 8d, and obtains the holding file list Ld from the user terminal 8d. Further, the user terminal 8b sends the holding file lists Lb and Ld to the user terminal 8c and obtains the holding file list Lc from the user terminal 8c. In the above, the holding file list La of the user terminal 8a, which both of the user terminals 8b and 8c already hold, is not transferred.

Further, suppose that the user terminal 8d connects to the user terminal 8e to exchange a file piece and that the maximum transfer number of times for the holding file list L is set to twice. In this case, the user terminal 8d does not transfer the holding file list La again as the holding file list La has already been transferred twice, namely, from the user terminal 8a to the user terminal 8b and from the user terminal 8b to the user terminal 8d. The user terminal 8d sends only the holding file lists Lb and Ld to the user terminal 8e, and obtains the holding file list Le from the user terminal 8e.

Note that although it is described in the above that each user terminal 8 sends a holding file list L to another user terminal 8 and produces a recommended file list for its own use, using the holding file list L obtained from the other user terminal 8, this is not an exclusive procedure. Instead, each user terminal 8 may send a recommended file list, when produced, to another user terminal 8. In this case, each user terminal 8 may select a data file to be newly obtained, referring to the plurality of recommended file lists obtained. In the above, each user terminal 8 may send intact the plurality of obtained recommended file lists to another user terminal 8 or may send one recommended file list produced for use in selection by itself of a data file to be newly obtained, based on the plurality of obtained recommended file lists to another user terminal 8.

As described above, according to the data distribution system 1 according to this embodiment, using a holding file list L obtained from another user terminal 8 in exchanging a file piece to obtain a target file F, each user terminal 8 can select as a data file to be newly obtained a data file which is estimated as highly relevant or similar to the obtained target file F. Also, according to the data distribution system 1 according to this embodiment, as network connection is established among user terminals 8 attempting to obtain the same target file F to exchange a file piece, use of such connection in exchanging a holding file list L makes it possible to exchange a holding file list L without establishing extra network connection. Accordingly, network traffic and server processing load can be reduced, compared to a case in which information about a data file obtained by each user terminal 8 is centrally managed by the content managing device 2 or the like and a recommended content list is produced for each user terminal 8, based on the centrally managed information.

In this embodiment, some of the plurality of data files to be distributed may be a data file subjected to distribution restriction based on a predetermined condition. Another characteristic of the data distribution system 1 according to this embodiment is that, in order to realize the above described distribution restriction of a data file, obtaining of at least one predetermined restricted piece among a plurality of file pieces constituting the data file by a user terminal 8 from another user terminal 8 is restricted, and that the distribution device 7 restricts distribution of the restricted piece to each user terminal 8, based on a predetermined condition. In the above, however, a file piece, other than a restricted piece, constituting a data file subjected to distribution restriction is normally distributed following the above described procedure.

Which of the plurality of file pieces is to be a restricted piece is designated by file information which the file information managing device 5 sends to user terminals 8. The file information managing device 5 sends file information held therein in response to a file information obtaining request from a user terminal 8 as described above, the file information including information specifying a restricted piece. The user terminal 8 obtains file information corresponding to a target file F to be obtained from the file information managing device 5, and can specify a restricted piece.

In the case where the target file F selected by the target file selection unit 21 is a data file subjected to distribution restriction, the file piece obtaining unit 23 excludes the restricted piece designated by the file information from file pieces to be obtained when sending a file piece obtaining request to another user terminal 8 indicated by the provider information obtained by the provider information obtaining unit 22. Further, in the case where a request for obtaining a file piece is received from another user terminal 8 after obtaining a restricted piece, the restricted piece is not distributed to the other user terminal 8. With the above, exchange of a restricted piece among user terminals 8 is prohibited. Therefore, the user terminal 8 needs to send a file piece obtaining request to the distribution device 7 when wishing to obtain a restricted piece, similar to a file piece which the user terminal 8 cannot obtain from any other user terminals 8.

Figure 6:
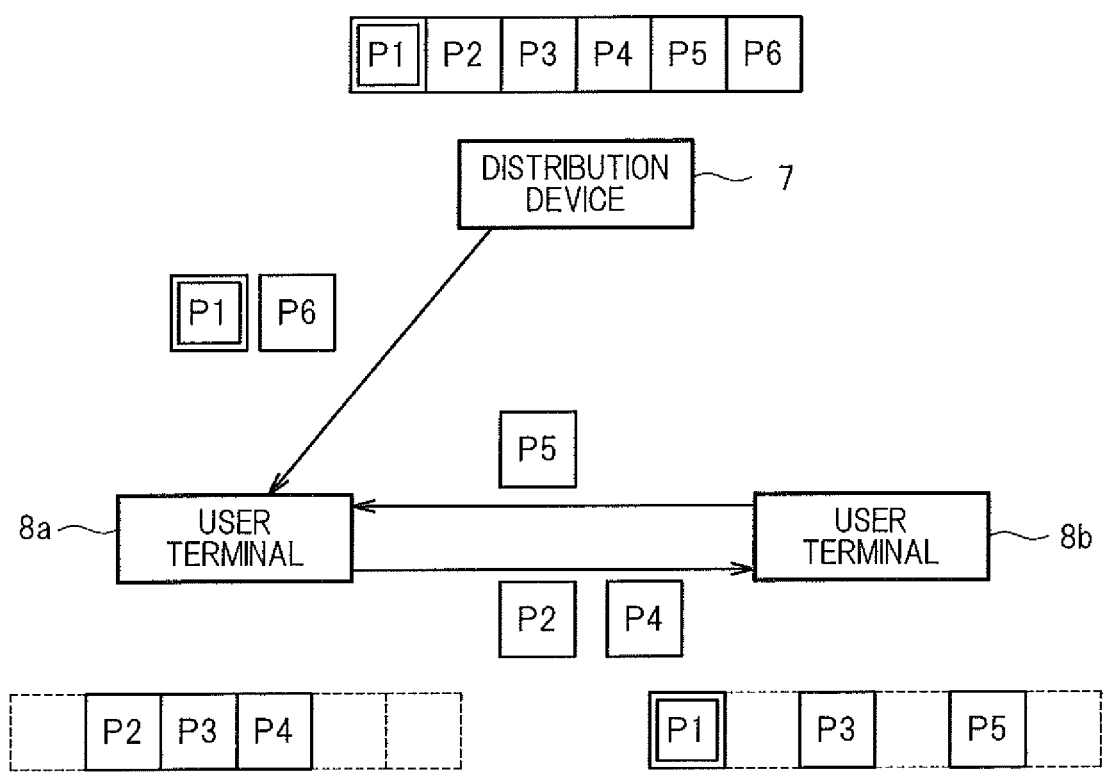
FIG. 6 is a diagram showing one example of file piece exchanging among devices when a data file is subjected to distribution restriction.

FIG. 6 is a diagram explaining an example of file piece exchanging by the file piece obtaining unit 23 in the case where distribution restriction is imposed on a data file as described above. Similar to the case described referring to FIG. 3, the user terminals 8a and 8b attempt to obtain the same target file F comprising six file pieces; the user terminal 8a has already obtained the file pieces P2, P3, and P4 from another user terminal 8; and the user terminal 8b has already obtained file piece P1, P3, and P5 from another user terminal 8. Different from the case shown in FIG. 3, in the example shown in FIG. 6, the target file F is subjected to distribution restriction and the file piece P1 is designated as a restricted piece. In this case, the user terminal 8a, having connected to the user terminal 8b and sending a file piece obtaining request, does not obtain the file piece P1, which is a restricted piece, but obtains only the file piece P5. Therefore, in order to obtain the file pieces P1 and P6, yet to be obtained, the user terminal 8a sends a file piece obtaining request to the distribution device 7.

Upon receipt of the above-described file piece obtaining request, the distribution device 7 determines whether or not distribution of the requested restricted piece to the user terminal 8 having sent the request is permitted, based on a predetermined condition. In the following, a case in which a disclosure date and time specifying a date and time on and at which to disclose a restricted data file is set in the data file will be described as a specific example. In this case, the distribution device 7 stores information indicating a predetermined disclosure date and time so as to be correlated to the data file, and upon receipt of a file piece obtaining request, compares the present date and time measured on a built-in clock with the predetermined disclosure date and time. When the time of receipt of the request is after the disclosure date and time, the restricted piece is distributed. Meanwhile, when the time of receipt of the request is before the disclosure date and time, distribution of the restricted piece is restricted. Note that a file piece other than a restricted piece may be distributed even though the request is received before the disclosure date and time. With the above, the user terminal 8 can obtain a file piece other than a restricted piece from another user terminal 8 or the distribution device 7 even before the predetermined disclosure date and time, but not a restricted piece from anywhere until the predetermined disclosure date and time.

Note that a condition to be referred to by the distribution device 7 when determining whether or not to distribute a restricted piece is not limited to arrival of a disclosure date and time, but various determination criteria may be employed. For example, the user terminal 8 may send a session ID assigned by the authentication device 3 when being authenticated by the authentication device 3, together with a file piece obtaining request to the distribution device 7, and the distribution device 7 may inquire of the authentication device 3, using the session ID, to determine whether or not distribution of the required restricted piece is permitted. In this case, the distribution device 7 may determine whether or not a user using the user terminal 8 having sent the session ID is a predetermined entitled user or inquire of the authentication device 3 whether or not the user pays for using content.

Note that for a distribution restricted data file in a data format which does not allow a user to use the data file unless the data file is complete, any file piece may be determined as a restricted piece. However, for a data file in a data format which permits execution of partial content of the data file in the user terminal 8 when some data file which includes data file control information is available in the user terminal 8, it is desirable to set a file piece including the control information as a restricted piece. With the above, it is possible to prevent a situation in which a user having obtained a file piece other than the restricted piece views or listens to a part of the content.

Also, whether or not a user terminal 8 satisfies a condition for obtaining a restricted piece may be determined also by the user terminal 8 itself, rather than only by the distribution device 7. In this case, file information to be sent by the information managing device 5 to the user terminal 8 includes not only information designating a restricted piece but also information describing a condition for obtaining the restricted piece. The user terminal 8 determines whether or not the condition included in the file information is satisfied (e.g., whether or not a disclosure date and time has arrived), and upon determination that the condition is satisfied, sends a file piece obtaining request to the distribution device 7. With the above, it is possible to prevent a user terminal 8 that is not entitled to obtain a restricted piece from sending a file piece obtaining request to the distribution device 7. In this case as well, with an arrangement in which the distribution device 7 determines whether or not distribution of the requested restricted piece in response to a file piece obtaining request is permitted, it is possible to avoid distribution of a restricted piece in response to an inappropriate file piece obtaining request. Note that in the case where the user terminal 8 does not determine by itself whether or not the user terminal 8 satisfies a condition for obtaining a restricted piece, the user terminal 8 may repetitively send a file piece obtaining request to the distribution device 7, e.g., every predetermined period of time so that the distribution device 7 determines, every receipt of the file piece obtaining request, whether or not the condition for distributing a restricted piece is satisfied. With the above, the user terminal 8 can obtain a restricted piece after the distribution condition is satisfied.

According to the above described method, when it is desired to impose distribution restriction on specific content, the data distribution system 1 restricts exchange of some restricted piece among user terminals 8 and determines whether or not distribution of the restricted piece is permitted by the distribution device 7, whereby distribution of the content to each user terminal 8 can be restricted according to a desired condition. That is, even after exchange of a data piece constituting a data file subjected to distribution restriction has already started among user terminals 8 carrying out peer-to-peer type data exchange, the data file distribution can be restricted. Further, as distribution of only some restricted piece, rather than a complete data file corresponding to the content, is restricted, concentration of network traffic to the distribution device 7 can be avoided even though distribution by the distribution device 7 to the respective user terminals 8 is restricted. With the above, it is possible to register content or the like having a disclosure date and time set thereto before the disclosure date and time so that the file pieces other than the restricted piece are available for distribution. In this case, the respective user terminals 8 can obtain the file pieces other than the restricted piece before the disclosure date and time, it is possible to avoid increase of network load due to user terminals 8 attempting with a rush to obtain the complete data file from the distribution device 7 on and after the disclosure date and time.

Figure 7:
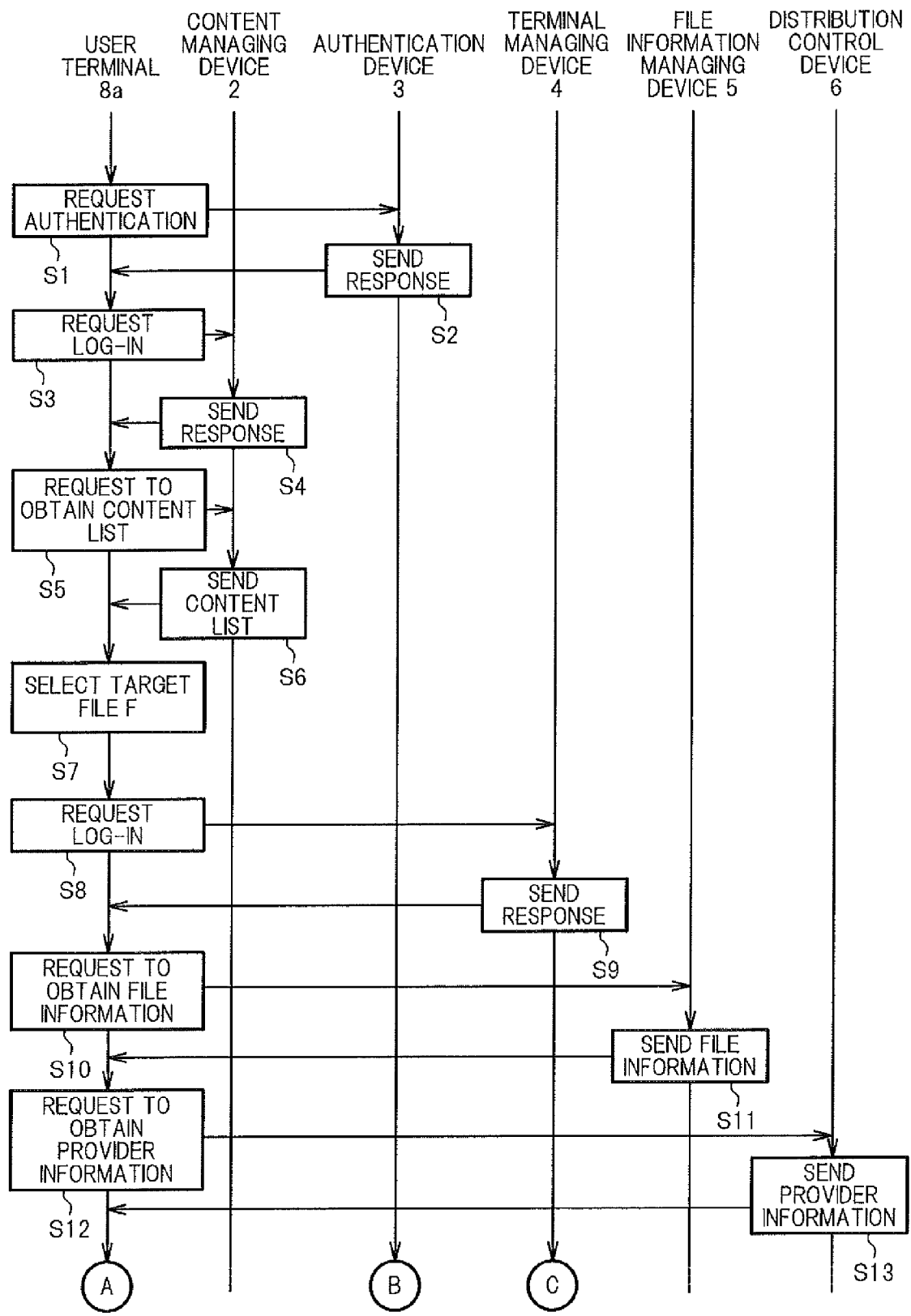
FIG. 7 is a flowchart of one example of a process to be carried out by the data distribution system according to this embodiment.

In the following, one example of a flow of a process to be carried out by the data distribution system 1 according to this embodiment will be described with reference to the flowchart shown in FIGS. 7 and 8. Note that a flow of a process to be carried out when the user terminal 8a selects and obtains a target file F comprising six file pieces will be described here. The target file F is subjected to distribution restriction in units of a user, and the file piece P1 is designated as a restricted piece.

Initially, the user terminal 8a sends to the authentication device 3 authentication information about a user using the user terminal 8a, to thereby request authentication of the user (S1). The authentication device 3 checks the received authentication information to determine whether or not to authenticate the user and returns the result to the user terminal 8a (S2). Specifically, for successful authentication, the authentication device 3 issues a session ID to identify the user having requested authentication, and sends the session ID included in the authentication result made at S2.

Upon receipt of the result of successful authentication made at S2, the user terminal 8a subsequently sends information specifying a user using the user terminal 8a to the content managing device 2 to thereby request log-in (S3). Thereupon, the content managing device 2 determines whether or not to permit log-in by the user specified by the received information, and sends the result of determination to the user terminal 8a (S4). With successful log-in, the user terminal 8a sends a request for obtaining a content list to the content managing device 2 (S5), and the content managing device 2 returns a content list held (S6). The user terminal 8a presents the content included in the content list sent from the content managing device 2 to the user, and selects as a target file F a data file corresponding to the content selected by the user (S7).

Thereafter, the user terminal 8a sends a log-in request including its own signal ID to the terminal managing device 4 (S8). Upon receipt of the log-in request at S8, the terminal managing device 4 records the signal ID of the sender user terminal 8a and information specifying a point to which the sender user terminal 8a is connected so as to be correlated to each other, and returns a response telling that log-in process is normally completed (S9). Thereafter, the user terminal 8a connects to another user terminal 8 via a network, utilizing address resolution by the terminal managing device 4, upon which data exchange with another user terminal 8 becomes possible.

Subsequently, the user terminal 8a sends a file information obtaining request to the file information managing device 5 which holds file information of the target file F selected at S7 (S10). Note that supposing that the user terminal 8a obtains, as a part of information concerning the content sent from the content managing device 2 at S6, information (URL or the like) specifying a point to which the file information managing device 5 holding the file information is connected, the user terminal 8a accesses the connection point specified by the information to thereby send a file information obtaining request to the file information managing device 5. The file information managing device 5, having received the file information obtaining request, sends file information of the target file F designated by the request to the user terminal 8a (S11).

The file information sent to the user terminal 8a at S11 includes information specifying a point to which the distribution control device 6 for controlling distribution of the target file F is connected. Having obtained the file information about the target file F, the user terminal 8a accesses the connection point of the distribution control device 6, the connection point being specified by the information, to send to the distribution control device 6 a request for obtaining information indicating a device which provides the target file F (provider information) (S12). In the above, the user terminal 8a sends to the distribution control device 6 a list of a data file which the user terminal 8a has already obtained or already started a process to obtain. In response to the request, the distribution control device 6 sends the provider information of the target file F (S13), and also adds the signal ID of the user terminal 8a to the provider information of each data file included in the list sent at S12.

The user terminal 8a having obtained the provider information at S13 sequentially connects to the provider devices (other user terminals 8 and the distribution device 7) indicated by the provider information to obtain a file piece constituting the target file F. It is determined here as an example that the provider information includes the signal ID of the user terminal 8b and the URL of the distribution device 7. In this case, the user terminal 8a initially establishes a session with the user terminal 8b and attempts to obtain a file piece.

Specifically, initially, the user terminal 8a sends to the terminal managing device 4 an address resolution request designating the signal ID of the user terminal 8b included in the provider information obtained at S13 (S14), and obtains information specifying a connection point of the user terminal 8b from the terminal managing device 4 (S15). The user terminal 8a then connects to the connection point specified by the information obtained and sends a file piece obtaining request to the user terminal 8b (S16). In response to the file piece obtaining request, the user terminal 8b sends a file piece held by itself, of the target file F (S17). In the above, the user terminal 8b does not send the file piece P1, which is a restricted piece, to the user terminal 8a even though the user terminal 8b does hold the file piece P1. Further, in the process at S17, the user terminal 8b additionally sends to the user terminal 8a a holding file list L showing data files which the user terminal 8b has ever obtained. Further, the user terminal 8a sends a holding file list L held by itself to the user terminal 8b (S18). Note that in the above the user terminal 8a does not have a file piece to send to the user terminal 8b as the user terminal 8a has obtained no file piece constituting the target file F until connection to the user terminal 8b is established.

Thereafter, in order to obtain the file piece P1, which is a restricted piece, and any other file piece which the user terminal 8b does not hold, the user terminal 8a accesses the URL included in the provider information obtained at S13, and sends a file piece obtaining request to the distribution device 7 (S19). In the above, the user terminal 8a additionally sends the session ID sent from the authentication device 3 at S2 to the distribution device 7. As a specific example, for communication with the distribution device 7 according to HTTP protocol, the user terminal 8a sends an HTTP request including the session ID as cookie information to the distribution device 7.

Having received the file piece obtaining request, the distribution device 7 sends the session ID included in the request to the authentication device 3 to thereby inquire about the requesting user (S20). Accordingly, the authentication device 3 determines whether or not a user of the user terminal 8a related to the received session ID has the right to obtain the target file F (S21), and sends a determination result to the distribution device 7 (S22). The flowchart shows a process to be carried out when the authentication device 3 determines that the user has the right to obtain the target file F. In this case, the distribution device 7 determines that distribution of a restricted piece to the user terminal 8a is permitted, and sends the requested file piece to the user terminal 8a (S23). Meanwhile, when the authentication device 3 determined that the user of the user terminal 8a does not have the right to obtain the target file F, the distribution device 7 prevents distribution of the restricted piece to the user terminal 8a, and distributes only another file piece which the user terminal 8a does not hold to the user terminal 8a.

Subsequently, the user terminal 8a assembles the file pieces obtained at S17 and S23 to thereby obtain the target file F (S24). Further, the user terminal 8a selects a target file F to be newly obtained, based on the list of data files which the user terminal 8b holds obtained at S17 (S25). Thereafter, the above described process at S10 and thereafter is repeated to obtain a new target file F. With the above, the user terminal 8 can obtain the target file F initially selected by the user and a data file related to the target file F.

Note that an embodiment of the present invention is not limited to the above described embodiment. For example, a part or all of the process described in the above as being carried out by the content managing device 2, authentication device 3, terminal managing device 4, file information managing device 5, distribution control device 6, and distribution device 7 may be carried out by a single server computer. Also, the user terminal 8, when serving as a primary distributor of a data file, may additionally provide the function of the distribution device 7 in connection with the data file.

A data file to be distributed by the data distribution system 1 may not always correspond to content such as a motion picture, sound, and the like. Also, when distribution restriction of data file is desired to be imposed, based solely on, e.g., a disclosure date and time, user authentication by the authentication device 3 may not be applied.

What is claimed is:

1. A data distribution system comprising
a distribution device comprising at least one non-transitory, computer readable recording medium for holding a computer data file which is a distribution object, the computer data file being divisible into a plurality of file pieces, and at least one but less than all of the file pieces being a restricted piece, where the at least one restricted piece is restricted in terms of where the at least one restricted piece may be obtained on the network, and the computer data file is unusable without the at least one restricted piece, and
a plurality of user terminals, wherein each of the user terminals comprises at least one computer processor and at least one non-transitory, computer readable recording medium for implementing: (i) a file piece obtaining unit configured to obtain any of the plurality of file pieces from the distribution device, and any of the plurality of file pieces, except the at least one restricted piece, from any of the other user terminals over the network; and (ii) a file obtaining unit configured to assemble the plurality of file pieces obtained to thereby obtain the computer data file,
wherein the distribution device restricts distribution of the at least one restricted piece to each of the user terminals, based on a predetermined condition such that the at least one restricted piece may only be obtained by the user terminals from the distribution device over the network.

2. The data distribution system according to claim 1, wherein the distribution device restricts, as the predetermined condition, distribution of the at least one restricted piece before arrival of a predetermined disclosure date and time.

3. The data distribution system according to claim 1, further comprising: a file information managing device for sending file information about the computer data file in response to a request from each of the user terminals, wherein the file information includes information specifying the at least one restricted piece.

4. The data distribution system according to claim 3, wherein
the file information further includes information about the predetermined condition, and
the file piece obtaining unit determines whether or not the predetermined condition indicated by the file information is satisfied, and upon determination that the condition is satisfied, sends a request for obtaining the at least one restricted piece to the distribution device.

5. A user terminal connected to a distribution device, comprising at least one non-transitory, computer readable recording medium, for holding a computer data file which is a distribution object and to one or more other user terminals, the computer data file being divisible into a plurality of file pieces, and at least one but less than all of the file pieces being a restricted piece, where the at least one restricted piece is restricted in terms of where the at least one restricted piece may be obtained on the network, and the computer data file is unusable without the at least one restricted piece, the user terminal comprising:
at least one computer processor and at least one non-transitory, computer readable recording medium for implementing: (i) a file piece obtaining unit configured to obtain any of the plurality of file pieces from the distribution device, and any of the plurality of file pieces, except the at least one restricted piece, from any of the other user terminals over the network; and (ii) a file obtaining unit configured to assemble the plurality of file pieces obtained to thereby obtain the computer data file,
wherein the at least one restricted piece for which obtaining from the other user terminals is not permitted is restricted by the distribution device based on a predetermined condition such that the at least one restricted piece may only be obtained by the user terminals from the distribution device over the network.

6. An information processing method to be carried out using a user terminal connected to a distribution device, comprising at least one non-transitory, computer readable recording medium, for holding a computer data file which is a distribution object, and to one or more other user terminals, the computer data file being divisible into a plurality of file pieces, and at least one but less than all of the file pieces being a restricted piece, where the at least one restricted piece is restricted in terms of where the at least one restricted piece may be obtained on the network, and the computer data file is unusable without the at least one restricted piece, the method comprising:
obtaining any of the plurality of file pieces from the distribution device, and any of the plurality of file pieces, except the at least one restricted, piece from any of the other user terminals over the network; and assembling the plurality of file pieces obtained to thereby obtain the computer data file, wherein the at least one restricted piece for which obtaining from the other user terminals is not permitted is restricted by the distribution device based on a predetermined condition such that the at least one restricted piece may only be obtained by the user terminals from the distribution device over the network.

7. A non-transitory, computer readable information storage medium storing a program for controlling a user terminal connected to a distribution device, comprising at least one non-transitory, computer readable recording medium, for holding a computer data file which is a distribution object and to one or more other user terminals, the computer data file being divisible into a plurality of file pieces, and at least one but less than all of the file pieces being a restricted piece, where the at least one restricted piece is restricted in terms of where the at least one restricted piece may be obtained on the network, and the computer data file is unusable without the at least one restricted piece, the program causing the user terminal to carry out actions, comprising:

obtaining any of the plurality of file pieces from the distribution device, and any of the plurality of file pieces, except the at least one restricted piece, from any of the other user terminals over the network; and assembling the plurality of file pieces obtained to thereby obtain the computer data file, wherein the at least one restricted piece for which obtaining from the other user terminals is not permitted is restricted by the distribution device based on a predetermined condition such that the at least one restricted piece may only be obtained by the user terminals from the distribution device over the network.

\* \* \* \* \*